(12) United States Patent
Huang et al.

(10) Patent No.: US 11,993,689 B2
(45) Date of Patent: May 28, 2024

(54) FOAMED THERMOPLASTIC POLYURETHANE AND MICROWAVE MOLDED BODY THEREOF

(71) Applicant: SUNKO INK CO., LTD., Taichung (TW)

(72) Inventors: Ting-Kai Huang, Taichung (TW); Yi-Jung Huang, Taichung (TW); Hsin-Hung Lin, Taichung (TW); Hong-Yi Lin, Taichung (TW); Ya-Chi Wang, Taichung (TW)

(73) Assignee: SUNKO INK CO., LTD., Taichung (TW)

( * ) Notice: Subject to any disclaimer, the term of this patent is extended or adjusted under 35 U.S.C. 154(b) by 726 days.

(21) Appl. No.: 17/251,171

(22) PCT Filed: Jun. 13, 2018

(86) PCT No.: PCT/CN2018/091068
§ 371 (c)(1),
(2) Date: Dec. 10, 2020

(87) PCT Pub. No.: WO2019/237280
PCT Pub. Date: Dec. 19, 2019

(65) Prior Publication Data
US 2021/0214515 A1    Jul. 15, 2021

(51) Int. Cl.
| | |
|---|---|
| *C08J 9/14* | (2006.01) |
| *B29C 35/08* | (2006.01) |
| *B29C 44/02* | (2006.01) |
| *B29C 44/34* | (2006.01) |
| *B29K 75/00* | (2006.01) |
| *C08K 3/34* | (2006.01) |
| *C08K 5/14* | (2006.01) |

(52) U.S. Cl.
CPC .......... *C08J 9/141* (2013.01); *B29C 35/0805* (2013.01); *B29C 44/02* (2013.01); *B29C 44/3415* (2013.01); *C08K 3/346* (2013.01); *C08K 5/14* (2013.01); *B29C 2035/0855* (2013.01); *B29K 2075/00* (2013.01); *C08J 2203/06* (2013.01); *C08J 2203/14* (2013.01); *C08J 2203/22* (2013.01); *C08J 2375/04* (2013.01)

(58) Field of Classification Search
CPC ...... C08J 9/14; C08J 2203/06; C08J 2203/14; C08J 2203/22; C08J 2375/04; B29C 35/0805; B29C 44/02; B29C 44/3415; B29C 2035/0855; C08K 3/346; C08K 5/14; B29K 2075/00
USPC .......................................................... 428/160
See application file for complete search history.

(56) References Cited

U.S. PATENT DOCUMENTS

| | | | | |
|---|---|---|---|---|
| 2017/0072599 A1* | 3/2017 | Huang | ................ | B29C 35/0805 |
| 2017/0218154 A1* | 8/2017 | Huang | ........................ | C08J 9/18 |
| 2019/0366600 A1* | 12/2019 | Baghdadi | ................. | C08J 9/122 |

FOREIGN PATENT DOCUMENTS

| | | | | |
|---|---|---|---|---|
| CN | 102971146 A | * | 3/2013 | ........... B05D 3/0254 |
| CN | 107022185 | | 8/2017 | |
| JP | 2001089594 A | * | 4/2001 | |
| JP | 2017017099 A | * | 1/2017 | |
| WO | 2015123960 | | 8/2015 | |

OTHER PUBLICATIONS

JP-2001089594-A Machine Translation (Year: 2001).*
International Search Report for International Application No. PCT/CN2018/091068.

* cited by examiner

*Primary Examiner* — Travis M Figg
(74) *Attorney, Agent, or Firm* — LIU & LIU

(57) ABSTRACT

The present invention relates to a foamable composition used to prepare foamed thermoplastic polyurethane and a microwave molded body thereof. The foamable composition includes unfoamed thermoplastic polyurethane particles, a thickener or a bridging agent, and a foaming agent, wherein the unfoamed thermoplastic polyurethane particles have a viscosity of 1,000 poise to 9,000 poise measured at 170° C. according to JISK 7311 test method.

18 Claims, No Drawings

FOAMED THERMOPLASTIC POLYURETHANE AND MICROWAVE MOLDED BODY THEREOF

BACKGROUND OF THE INVENTION

Field of the Invention

The invention relates to foamed thermoplastic polyurethane and a microwave molded body thereof.

Description of the Prior Art

Thermoplastic polyurethane (TPU) is the raw material of thermoplastic elastomers (TPE). The TPE made from TPU has many advantages, such as viscosity, high elasticity, abrasion resistance, impact resistance, distortion resistance, high extensibility, weather resistance, chemical resistance, non-toxicity, and high tear strength etc., and has been widely used in shoes, automobiles, packaging materials, heat insulation materials, and other products.

Injection molding is the most common method for preparing TPU molded foam in the prior art. The injection molding process involves heating the plastic rubber particles in the injection molding machine to form a melt, which is then compressed to move through the nozzles and injected into the mold at lower temperature. Therefore, the production process of injection molding is time consuming. Also, the weight of the injection mold is quite heavy, leading to the inconvenience of replacement of the mold. Another method for preparing TPU molded foam in the prior art is steam molding method. However, the steam molding method involves high-temperature or high-pressure processes, which often need to consume more energy, resulting in increased costs. Different from the injection molding method and the steam molding method, the molded body manufactured by the microwave method has a simple process and saves time and energy. Microwave molded TPU foam has been applied to various products. For example, microwave molded TPU foam has been successfully applied to shoes, which have the advantages of comfort, flexibility and light weight at the same time.

However, the viscosity of the unfoamed thermoplastic polyurethane particles contained in the foamable composition is usually limited to more than 10,000 poise, which is suitable for forming microwave molded TPU foam. If the unfoamed particles with a viscosity of less than 10,000 poises are used, the foamed particles formed will have poor foaming after microwave, resulting in poor molding of the microwave molded body (such as easily deformed appearance, collapse, poor adhesion between particles, and poor molding stability).

SUMMARY OF THE INVENTION

The present invention unexpectedly discovered that the thickener or bridging agent can be used to improve the above-mentioned problems. Adding the thickener or bridging agent can change the viscoelastic properties or molecular bonding structure of polyurethane particles, thereby enhancing the structural strength between molecular chains. The present invention provides a foamable composition suitable for a microwave molded body. The foamable composition comprises unfoamed thermoplastic polyurethane particles with a viscosity of 1,000 poise to 9,000 poise, and a thickener or bridging agent. The viscosity is measured at 170° C. according to JISK 7311 test method.

In one aspect, the present invention provides a foamable composition (also called a formulation) for making foamed thermoplastic polyurethane, foamed thermoplastic polyurethane prepared through foaming and pelletizing of the foamable composition, and a method for foaming and pelletizing thereof. The foamed thermoplastic polyurethane of the present invention has the characteristics of capable of being re-foamed by microwave treatment, so the present invention also provides a microwave molded body that is formed by secondary foaming of the foamed thermoplastic polyurethane described above using microwave treatment and a manufacturing method thereof. The foamed thermoplastic polyurethane of the present invention has the advantage of being lighter. Each particle of the foamed thermoplastic polyurethane will generate bonding effect on its surface upon being heated by microwave and simultaneously be foamed again to form the microwave molded body (also known as thermoplastic polyurethane foam material). Different from the existing injection molding method and steam molding method, the molded body manufactured by the microwave method is simple in process and saves time and energy.

In one embodiment, the present invention provides a foamable composition for preparing foamed thermoplastic polyurethane, and the foamable composition includes 100 parts by weight of unfoamed thermoplastic polyurethane particles, 5 to 25 parts by weight of a foaming agent, and 0.5 to 5 parts by weight of a thickener or a bridging agent, wherein the unfoamed thermoplastic polyurethane particles have a viscosity of 1,000 poise to 9,000 poise measured at 170° C. according to JISK 7311 test method.

In one embodiment, the present invention provides the foamable composition described above, wherein the thickener is selected from an inorganic thickener, a polyacrylic acid thickener, or a cellulose thickener.

In one embodiment, the present invention provides the foamable composition described above, wherein the bridging agent is selected from dicumyl peroxide (DCP), benzoyl peroxide, di-tert-butyl peroxide, or dicumyl hydrogen peroxide 2,5-dimethyl-2,5-di-tert-butylperoxy hexane.

In one embodiment, the present invention provides the foamable composition described above, wherein the inorganic thickener is selected from bentonite or aluminum silicate, the polyacrylic acid thickener is selected from a thickener formed from a carboxylic acid monomer of acrylic acid, maleic acid, maleic anhydride or methacrylic acid, and the polyacrylic acid thickener is selected from a thickener formed by methyl cellulose, carboxymethyl cellulose, hydroxyethyl cellulose, or hydroxypropyl methyl cellulose.

In one embodiment, the present invention provides the foamable composition described above, wherein the unfoamed thermoplastic polyurethane particles have a particle size of 2.5 mm to 4.5 mm.

In one embodiment, the present invention provides the foamable composition described above, wherein a hardness of the unfoamed thermoplastic polyurethane particles is 40 Shore A scale to 64 Shore D scale.

In one embodiment, the present invention provides the foamable composition described above, wherein a density of the unfoamed thermoplastic polyurethane particles is 1.0 g/cm$^3$ to 1.25 g/cm$^3$.

In one embodiment, the present invention provides the foamable composition described above, comprising 100 parts by weight of the unfoamed thermoplastic polyurethane particles and 5 to 20 parts by weight of the foaming agent.

In one embodiment, the present invention provides the foamable composition described above, wherein the foaming agent is expandable microspheres, carbon dioxide ($CO_2$), or a hydrocarbon compound with a carbon number of 4 to 10.

In one embodiment, the present invention provides the foamable composition described above, further comprising 0.1 to 5 parts by weight of talc powder.

In one embodiment, the present invention provides the foamable composition described above, further comprising 1 to 20 parts by weight of a plasticizer, wherein the plasticizer is a benzoate or a derivative thereof.

In one embodiment, the present invention provides the foamable composition described above, further comprising 0.1 to 5 parts by weight of a pigment powder, based on 100 parts by weight of the unfoamed thermoplastic polyurethane particles.

In one embodiment, the present invention provides the foamable composition described above, further comprising 1 to 5 parts by weight of the thickener or the bridging agent.

In one embodiment, the present invention provides a foamed thermoplastic polyurethane prepared through foaming and pelletizing of the foamable composition of any one of the above in a screw pelletizer.

In one embodiment, the present invention provides the foamed thermoplastic polyurethane described above, wherein the foamed thermoplastic polyurethane contains residual foaming agent.

In one embodiment, the present invention provides the foamed thermoplastic polyurethane described above, wherein the foamed thermoplastic polyurethane has a particle size of 3 mm to 7.5 mm.

In one embodiment, the present invention provides the foamed thermoplastic polyurethane described above, wherein the foamed thermoplastic polyurethane has a hardness of 40 Shore C scale to 80 Shore C scale.

In one embodiment, the present invention provides the foamed thermoplastic polyurethane described above, wherein the foamed thermoplastic polyurethane has a density of 0.2 $g/cm^3$ to 0.8 $g/cm^3$.

In one embodiment, the present invention provides a microwave molded body, which is formed by subjecting the foamed thermoplastic polyurethane described above to microwave.

In one embodiment, the present invention provides the microwave molded body described above, wherein the microwave molded body has a density of 0.15 $g/cm^3$ to 0.6 $g/cm^3$.

In one embodiment, the present invention provides the microwave molded body described above, wherein the microwave molded body has a hardness of 40 Shore C scale to 80 Shore C scale.

In one embodiment, the present invention provides the microwave molded body described above, wherein the microwave molded body is made with a microwave power of 500 W to 30,000 W.

In one embodiment, the present invention provides the microwave molded body described above, wherein no water is added during the treatment of microwave.

In one embodiment, the present invention provides the microwave molded body described above, wherein water or alcohol of 1 to 10 parts by weight is added during the treatment of microwave, based on 100 parts by weight of the foamed thermoplastic polyurethane.

The present invention also includes other aspects and various microwave molded bodies for solving other problems and being combined with the above aspects to be disclosed in detail in the following embodiments.

DETAILED DESCRIPTION OF THE EMBODIMENTS

For fully understanding the present invention and the claims asserted therein, preferred embodiments of the invention will be demonstrated below. The descriptions about well-known components, related materials, and associated processing techniques will be omitted to avoid obscuring the content of the invention.

Preparation of the Foamable Compositions for Foamed Thermoplastic Polyurethanes

The foamable compositions for preparing foamed thermoplastic polyurethanes of the present invention mainly comprise non-foamed thermoplastic polyurethane particles, a thickener or a bridging agent, and a foaming agent. The viscosity of the non-foamed thermoplastic polyurethane particles of the composition is between 1,000 poise and 9,000 poise, which facilitates preliminarily foamed particles to proceed with a second foaming well. The viscosity is measured at 170° C. according to JISK 7311 test method. Preferably, the viscosity of the non-foamed thermoplastic polyurethane particles is between 3,000 poise and 8,000 poise, which enhanced both the second foaming ability of the preliminarily foamed particles and the mechanical strength of the re-foamed materials.

The content of the thickener or the bridging agent is preferably 0.5 to 5 parts by weight, based on 100 parts by weight of the non-foamed thermoplastic polyurethane particles. The content of the foaming agent is preferably 5 to 25 parts by weight, based on 100 parts by weight of the non-foamed thermoplastic polyurethane particles, and more preferably 5 to 20 parts by weight if better mechanical strength is needed. According to the embodiments of the present invention, the non-foamed thermoplastic polyurethane particles of the composition preferably have a particle size between 2.5 mm (millimeter) and 4.5 mm. As described herein, particle size is referred to the measurements of the longest axes of the particles. According to other embodiments of the present invention, the non-foamed thermoplastic polyurethane particles of the composition preferably have a hardness of 40 Shore A scale to 64 Shore D scale. According to still other embodiments of the present invention, the non-foamed thermoplastic polyurethane particles of the composition preferably have a density between 1.0 $g/cm^3$ and 1.25 $g/cm^3$. The density as referred to herein is measured according to the Archimedes principle (buoyancy method).

The foamed thermoplastic polyurethanes of the present invention have a good re-foaming property. The so-called "re-foaming" property means that the foamed thermoplastic polyurethane formed through the preliminary foaming can be foamed again (for the second time), especially by the treatment of microwave. After the re-foaming, the particles of such kind of foamed thermoplastic polyurethane expand significantly and bond closely to form a foamed, molded body exhibiting a full shape, which represents a good re-foaming.

The non-foamed thermoplastic polyurethane particles of the foamable composition can be esters, ethers, polycaprolactones, or polycarbonates. As to the preparation of the non-foamed thermoplastic polyurethane particles, for example, diisocyanate, polyester polyol, the chain extender, the catalysts and other additives can be mixed to react at about 200-300° C. and then subjected to the injection molding or extrusion treatment known in the art to obtain non-foamed thermoplastic polyurethane particles. Diisocyanate can be selected from 4,4-methylene bis(phenyl isocyanate) (MDI), m-xylylene diisocyanate (XDI), 1,4-phenylene diisocyanate, 1,5-naphthalene diisocyanate, toluene diisocyanate (TDI), isophorone diisocyanate (IPDI), hexamethylene diisocyanate (HDI) and dicyclohexylmethane-4,4-diisocyanate. MDI or TDI is preferable. Polyester polyol is polyester formed from dibasic acid and diol. The diol can have 2 to 10 carbon atoms, and the dibasic acid can be a straight or branched chain having 4 to 12 carbon atoms. 1,4-butylene adipate is preferable. The chain extender is a diol having 2 to 12 carbon atoms; such as ethylene glycol, diethylene glycol, propylene glycol, dipropylene glycol, 1,4-butanediol, 1,6-hexanediol, 1,3-butylene glycol, 1,5-pentanediol, 1,4-cyclohexane dimethanol, neopentyl glycol, benzene diol, xylene glycol, or a combination thereof. The catalyst can be selected from triethylamine, dimethyl cyclohexylamine, stannous dioctoate, dibutyltin dioctoate, dibutyltin dilaurate, dibutyltin diacetate, and a combination thereof. Various additives, such as pigments, fillers, antioxidants, reinforcing agents, lubricants, plasticizers, or the like can be used in injection molding or extrusion processes.

The foamable composition contains a thickener or a bridging agent. The thickener can be the inorganic thickener (for example, bentonite, aluminum silicate, etc.), the polyacrylic thickener (for example, the carboxylic acid monomer, such as acrylic acid, maleic acid or maleic anhydride, methacrylic acid, etc.), or the cellulose thickener (methyl cellulose, carboxymethyl cellulose, hydroxyethyl cellulose, hydroxypropyl methyl cellulose, etc.). The bridging agent can be dicumyl peroxide (DCP), benzoyl peroxide, di-tert-butyl peroxide, dicumyl hydrogen peroxide 2,5-dimethyl-2, 5-di-tert-butylperoxy hexane and so on.

The foaming agent in the foamable composition can be an organic foaming agent or an inorganic foaming agent. Examples of the organic foaming agents can be, for example, azo compounds (such as azodicarboxylic amide, azobisisobutyronitrile, diisopropyl azodicarboxylate), sulfonamide compounds (such as 4,4-oxybis benzene sulfonyl hydrazine, p-benzene sulfonyl hydrazine, 1,4-xylylene sulfonyl hydrazide), nitroso compounds (such as dinitroso terephthalic amide, N,N'-dinitroso pentamethylene tetramine), carbon dioxide ($CO_2$), hydrocarbons having 4 to 10 carbon atoms (such as n-pentane, isopentane and cyclopentane), or expandable microspheres (such as inflatable microcapsules, micro spherical foam powders). More preferably, the foaming agent is expandable microspheres.

In addition to the non-foamed thermoplastic polyurethane particles, the thickener or the bridging agent, and the foaming agent, the foamable composition for preparing the foamed thermoplastic polyurethanes of the present invention can comprise the inorganic filler and the plasticizer as needed. The inorganic filler is, for example, talc powder, mica powder, sodium thiosulfate, or the like being used as the mold release agent. Preferably, the inorganic filler is talc powder. According to various embodiments, based on 100 parts by weight of the non-foamed thermoplastic polyurethane particles, there is preferably 0.1 to 5 parts by weight of talc powder. The plasticizer can be benzoic acid compounds (e.g., benzoates, such as methyl benzoate, ethyl benzoate, dipropylene glycol dibenzoate, etc., and derivatives thereof), esters (such aa triethyl citrate, trimethyl citrate, acetyl triethyl citrate, and derivatives thereof), ethers (such as adipic acid ether ester, glycol butyl ether ester, and derivatives thereof), polycaprolactones (such as polycaprolactone diol, and derivatives thereof), or polycarbonates (such as methyl polycarbonate, phenyl polycarbonate, and derivatives thereof). Benzoate or a derivative thereof is preferred. According to various embodiments, based on 100 parts by weight of the non-foamed thermoplastic polyurethane particles, there is preferably 1 to 20 parts by weight of the plasticizer.

In a preferred embodiment, the foamable composition for preparing the foamed thermoplastic polyurethane of the present invention has the following formulation: 100 parts by weight of the non-foamed thermoplastic polyurethane particles; 0.5 to 5 parts by weight of the thickener or the bridging agent; 0.1 to 5 parts by weight of talc powder; 1 to 20 parts by weight of the plasticizer; and 5 to 25 parts by weight of the foaming agent, in which the non-foamed thermoplastic polyurethane particles have a viscosity from 1,000 poise to 9,000 poise measured at 170° C. according to JISK 7311 test method. If both talc powder and the plasticizer are needed, the formulation described above facilitates the formation of foamed thermoplastic polyurethanes having uniform pore size and particle size.

In addition, a variety of pigment powders can be added to the foamable composition. According to various embodiments, based on 100 parts by weight of the non-foamed thermoplastic polyurethane particles, there is preferably 0.1 to 5 parts by weight of pigment powders.

Method of Preparing Foamed Thermoplastic Polyurethanes

The method of preparing foamed thermoplastic polyurethanes through foaming and pelletizing will be illustrated by way of example below. First, the foamable composition having the formulation described above (comprising the non-foamed thermoplastic polyurethane particles, the thickener or the bridging agent, and the foaming agent, or optionally added inorganic fillers, plasticizers, pigments, etc.) is poured into a single-screw pelletizer for foaming and pelletizing. The single-screw pelletizer has a die head temperature from 100° C. to 180° C., an extrusion speed from 50 kg/h to 70 kg/h, a die head pressure from 35 $kgf/cm^2$ to 65 $kgf/cm^2$, and an underwater pelletizing temperature from 10° C. to 20° C. Preferably, the die head temperature of the single-screw pelletizer is from 110° C. to 165° C., more preferably from 110° C. to 150° C. The foaming and pelletizing method described above or other suitable methods can be used to prepare the foamed thermoplastic polyurethanes. It is noted that if the extrusion speed is too low, the particles would be excessively foamed (called screw-induced over foaming), leading to failure of microwave re-foaming.

The foamed thermoplastic polyurethane particles, each single particle having a plurality of colors, can be prepared in reference to the method described above. For example, a variety of foamable compositions, each composition containing a single and different color pigment, such as a first foamable composition containing a black pigment and a second foamable composition containing a red pigment, can be prepared first. Afterwards, the first foamable composition is added portion-wise into the single-screw pelletizer, during which a portion of the second foamable composition is added between any two portion-wise additions of the first foamable composition. In this way, the foamed thermoplastic polyurethanes having a variety of colors in each single particle can be formulated.

Foamed Thermoplastic Polyurethanes

The foamed thermoplastic polyurethanes of the present invention can be produced according to the foamable composition and the method described above, but is not limited thereto. Preferably, the foamed thermoplastic polyurethanes of the present invention have a re-foaming property, i.e., the foamed thermoplastic polyurethanes of the present invention can be re-foamed by the treatment of microwave or other suitable methods to obtain a lower density. Specifically, in the preferred embodiments, the present invention provides the foamed thermoplastic polyurethanes having a density in the range of 0.2 g/cm$^3$ to 0.8 g/cm$^3$. The foamed thermoplastic polyurethanes are treated by microwave to re-foam and obtain a density in the range of 0.15 g/cm$^3$ to 0.6 g/cm$^3$, which is lower than the density before the microwave treatment. As described herein, the process of forming the foamed thermoplastic polyurethanes through the foaming and pelletizing of the foamable composition is referred to as the first foaming stage, and the process for the re-foaming of the foamed thermoplastic polyurethanes resulted from the first foaming stage is called the second foaming stage. In one preferred embodiment, the foamed thermoplastic polyurethanes formed at the first foaming stage have residual foaming agent, but the present invention is not limited thereto. The re-foaming ability of the foamed thermoplastic polyurethanes might be enhanced by the residual foaming agent, the level of which might be controlled by adjusting the formulation of the foamable composition or controlling the processes of the foaming and pelletizing. According to some embodiments of the present invention, the foamed thermoplastic polyurethanes formed at the first foaming stage preferably have a particle size from 3 mm to 7.5 mm. According to other embodiments of the present invention, the foamed thermoplastic polyurethanes formed at the first foaming stage preferably have a hardness of 40 Shore C scale to 80 Shore C scale. According to still other embodiments of the present invention, the foamed thermoplastic polyurethanes formed at the first foaming stage preferably have a density from 0.2 g/cm$^3$ to 0.8 g/cm$^3$. The foamed thermoplastic polyurethanes formed at the first foaming stage can have a variety of shapes, such as spherical, flaky, non-spherical, irregular shaped and the like.

Microwave Molded Body and the Method Thereof

The microwave molded body of the present invention is formed at the second foaming stage using microwave treatment. The foamed materials treated by microwave have pores that are more uniform and finer than that of the foamed thermoplastic polyurethanes not treated by microwave, and thus have the advantage of light weight. In addition, microwave treatment also makes the surfaces of the particles of the foamed thermoplastic polyurethanes bond with each other, and thus produces the microwave molded body. According to various embodiments, the microwave molded body prepared by the present invention can preferably have the following properties: a preferable hardness of 40 Shore C scale to 80 Shore C scale; and a preferable density of 0.15 g/cm$^3$ to 0.6 g/cm$^3$.

In accordance with various embodiments, the microwave molded body of the present invention can be prepared as follows: an appropriate amount of the foamed thermoplastic polyurethanes formed at the first foaming stage is put in a container, and then irradiated with microwave. The container can be a variety of molds, such as ceramic molds, plastic molds, glass molds, or composite molds made from metals and plastics, wherein the preferred one is composite molds made from metals and plastics. In the microwave foaming process, the power of the microwave is preferably from 500 watts (W) to 30,000 W, and more preferably from 5,000 W to 25,000 W at frequency for microwave 2,450 MHz, and the duration of microwave is from 3 seconds to 300 seconds, and more preferably from 5 seconds to 120 seconds. According to certain embodiments, no water is needed to add during the treatment of microwave. In some embodiments, water or alcohols can be added as the microwave medium during the treatment of microwave. In these embodiments, based on 100 parts by weight of the foamed thermoplastic polyurethanes, the medium is used in an amount of 1 to 10 parts by weight. The medium can be a polar medium, such as alcohols, including primary alcohols (e.g., methanol or ethanol) and secondary alcohols (e.g., ethylene glycol or propylene glycol), but is not limited thereto.

In summary, the thermoplastic polyurethane foam having all the advantages of light weight (high foaming ratio), stable quality, uniform distribution of pores, etc. can be produced by providing the foamable composition having suitable formulation and performing the first foaming stage and pelletizing process and the second stage microwave foaming process sequentially.

Various examples will be set forth below to illustrate the detailed description of the present invention in detail. The benefits and efficacy achieved by the present invention can be readily understood by those skilled in the art from the content of the specification, and various modifications and changes can be made by practicing and applying the contents of the present invention without departing from the spirit of the invention.

The First Stage Pelleting and Foaming: Example 1a, Example 2a and Comparative Examples 1a'

Example 1a: 100 parts by weight of non-foamed thermoplastic polyurethane particles (trade name: T955PLVM2, having a hardness of 50 Shore A scale and a viscosity of 9,000 poise (170° C.), available from Sunko Ink Co., Ltd.), 2.5 parts by weight of methyl benzoate (being the plasticizer), 2.5 parts by weight of aluminum silicate (being the thickener), 0.1 part by weight of talc powder, and 15 parts by weight of expandable microspheres (trade name: Expancel 930DU-120, available from Matsumoto, being the foaming agent) are mixed uniformly and poured into the single-screw pelletizer, which performs the first foaming stage and pelletizing process to obtain the preliminary foamed thermoplastic polyurethanes. The single-screw pelletizer is operated under the following conditions: a material extrusion speed of 50 kg/h, a die head pressure of 50 kgf/cm$^2$, a die head temperature of 155° C., a screw rod temperature of 120-170° C., and an underwater pelletizing temperature of 20° C. The preliminary foamed thermoplastic polyurethane has a density of 0.33 g/cm$^3$ and is granular.

Example 2a: 100 parts by weight of non-foamed thermoplastic polyurethane particles (trade name: T955PLVM2, having a hardness of 50 Shore A scale and a viscosity of 9,000 poise (170° C.), available from Sunko Ink Co., Ltd.), 2.5 parts by weight of methyl benzoate (being the plasticizer), 1.0 part by weight of dicumyl peroxide (being the bridging agent), 0.1 part by weight of talc powder, and 15 parts by weight of expandable microspheres (trade name: Expancel 930DU-120, available from Matsumoto, being the foaming agent) are mixed uniformly and poured into the single-screw pelletizer, which performs the first foaming stage and pelletizing process to obtain the preliminary foamed thermoplastic polyurethanes. The single-screw pelletizer is operated under the following conditions: a material extrusion speed of 50 kg/h, a die head pressure of 50 kgf/cm$^2$, a die head temperature of 155° C., a screw rod temperature of 120-170° C., and an underwater pelletizing temperature of 20° C. The preliminary foamed thermoplastic polyurethane has a density of 0.32 g/cm$^3$ and is granular.

Comparative Examples 1a': 100 parts by weight of non-foamed thermoplastic polyurethane particles (trade name:

T955PLVM2, having a hardness of 50 Shore A scale and a viscosity of 9,000 poise (170° C.), available from Sunko Ink Co., Ltd.), 2.5 parts by weight of methyl benzoate (being the plasticizer), 0.1 part by weight of talc powder, and 15 parts by weight of expandable microspheres (trade name: Expancel 930DU-120, available from Matsumoto, being the foaming agent) are mixed uniformly and poured into the single-screw pelletizer, which performs the first foaming stage and pelletizing process without addition of the thickener or the bridging agent. The single-screw pelletizer is operated under the following conditions: a material extrusion speed of 50 kg/h, a die head pressure of 35 kgf/cm$^2$, a die head temperature of 155° C., a screw rod temperature of 120-170° C., and an underwater pelletizing temperature of 20° C. The preliminary foamed thermoplastic polyurethane has a density of 0.48 g/cm$^3$ and is granular.

The Second Stage Microwave Foaming: Example Tb, Example 2b and Comparative Examples 1b'

Example 1b: 72 parts by weight of the foamed thermoplastic polyurethane (named as Ta) obtained in Example 1a described above and 3 parts by weight of water are placed in a mold, which has a length of 20 cm, a width of 12 cm, and a height of 1.2 cm. Afterwards, the second stage microwave foaming process is performed using a microwave power of 8,000 W at frequency for microwave 2,450 MHz and a microwave duration of 35 seconds. After the mold is cooled down, the preparation of the thermoplastic polyurethane microwave molded body is completed, and the microwave molded body has an average density of 0.27 g/cm$^3$.

The preparation method of Example 2b and Comparative Examples 1b' may refer to that of Example 1b. The preparation conditions of each example are listed in Table 1 and Table 2.

Analysis and Discussion of Examples and Comparative Examples

Examples 1a/1b and 2a/2b and Comparative Examples 1a'/1b' (Adding the Thickener/the Bridging Agent)

The difference between Comparative Example 1a' and Example 1a is that Example 1a uses the thickener. The difference between Comparative Example 1a' and Example 2a is that Example 2a uses the bridging agent. Since Comparative Example 1a does not use the thickener or the bridging agent, the foamed thermoplastic polyurethane has too low viscosity and insufficient strength in the first foaming stage, which makes the foamed particles unable to be molded stably, resulting in obvious shrinkage phenomenon on the particles during cooling and thus increase in density. Although Comparative Example 1a can successfully obtain foamed thermoplastic polyurethane (having a density of 0.48 g/cm$^3$), the particles have poor swellability after being subjected to microwaves, and therefore collapsed and failed to present a microwave foamed and molded body with a full shape.

TABLE 1

| The first foaming agent and pelletizing | | Ex. 1a | Ex. 2a | Comp Ex. 1a' |
|---|---|---|---|---|
| Non-foamed TPU | Wt. % | 100 | 100 | 100 |
| | Trade name | TP955PLVM2 | TP955PLVM2 | TP955PLVM2 |
| | Shore hardness | 50A | 50A | 50A |
| | Viscosity (poise) | 9,000 | 9,000 | 9,000 |
| | Density (g/cm$^3$) | 1.13 | 1.13 | 1.13 |
| | Particle diameter (mm) | 3.5 | 3.5 | 3.5 |
| Aluminum silicate | Wt. % | 2.5 | — | — |
| Dicumyl peroxide | Wt. % | — | 1.0 | — |
| Talc powder | Wt. % | 0.1 | 0.1 | 0.1 |
| Methyl benzoate | Wt. % | 2.5 | 2.5 | 2.5 |
| Foaming agent | Type | 930DU-120 | 930DU-120 | 930DU-120 |
| | Wt. % | 15 | 15 | 15 |
| Extrusion speed | kg/h | 50 | 50 | 50 |
| Die head pressure | kgf/cm$^2$ | 50 | 50 | 35 |
| Die head temp. | ° C. | 155 | 155 | 155 |
| Screw rod temp. | ° C. | 120-170 | 120-170 | 120-170 |
| Underwater pelletizing temp. | ° C. | 20 | 20 | 20 |
| Preliminary foamed TPU | Name | 1a | 1b | 1a' |
| | Shore hardness | 57C | 57C | 60C |
| | Density (g/cm$^3$) | 0.33 | 0.32 | 0.48 |
| | Particle diameter (mm) | 6.5 | 6.5 | 6.0 |

TABLE 2

| The second stage microwave foaming | | Ex. 1b | Ex. 2b | Ex. 1b' |
|---|---|---|---|---|
| Preliminary foamed TPU | Name | 1a | 2a | 1a' |
| | Wt. % | 72 | 72 | 72 |
| Medium | Type | Water | Water | Water |
| | Wt. % | 3 | 3 | 3 |
| Microwave power | W | 8000 | 8000 | 8000 |
| Microwave duration | sec | 35 | 35 | 35 |
| Microwave molded body | Shore hardness | 52C | 53C | Failed |
| | Density (g/cm$^3$) | 0.27 | 0.28 | Failed |

What is claimed is:

1. A microwave molded body, wherein the microwave molded body is formed by placing particles of foamed thermoplastic polyurethane in a mold and subjecting the particles of foamed thermoplastic polyurethane to microwave at a second foaming stage, the particles of the foamed thermoplastic polyurethane are prepared through foaming and pelletizing of a foamable composition in a screw pelletizer at a first foaming stage, and the foamable composition comprises: 100 parts by weight of unfoamed thermoplastic polyurethane particles, 5 to 25 parts by weight of a foaming agent, and 0.5 to 5 parts by weight of a thickener or a bridging agent, wherein the thickener is selected from an inorganic thickener or a cellulose thickener, wherein the unfoamed thermoplastic polyurethane particles have a viscosity of 1,000 poise to 9,000 poise measured at 170° C. according to JISK 7311 test method.

2. The microwave molded body of claim 1, wherein a density of the microwave molded body is 0.15 g/cm$^3$ to 0.6 g/cm$^3$.

3. The microwave molded body of claim 1, wherein a hardness of the microwave molded body is 40 Shore C scale to 80 Shore C scale.

4. The microwave molded body of claim 1, wherein the bridging agent is selected from dicumyl peroxide (DCP), benzoyl peroxide, di-tert-butyl peroxide, or dicumyl hydrogen peroxide 2,5-dimethyl-2,5-di-tert-butylperoxy hexane.

5. The microwave molded body of claim 1, wherein the inorganic thickener is selected from bentonite or aluminum silicate, and the cellulose thickener is selected from a thickener formed by methyl cellulose, carboxymethyl cellulose, hydroxyethyl cellulose, or hydroxypropyl methyl cellulose.

6. The microwave molded body of claim 1, wherein the unfoamed thermoplastic polyurethane particles have a particle size of 2.5 mm to 4.5 mm.

7. The microwave molded body of claim 1, wherein a hardness of the unfoamed thermoplastic polyurethane particles is 40 Shore A scale to 64 Shore D scale.

8. The microwave molded body of claim 1, wherein a density of the unfoamed thermoplastic polyurethane particles is 1.0 g/cm$^3$ to 1.25 g/cm$^3$.

9. The microwave molded body of claim 1, comprising 100 parts by weight of the unfoamed thermoplastic polyurethane particles and 5 to 20 parts by weight of the foaming agent.

10. The microwave molded body of claim 1, wherein the foaming agent is expandable microspheres, carbon dioxide ($CO_2$), or a hydrocarbon compound with a carbon number of 4 to 10.

11. The microwave molded body of claim 1, wherein the foamable composition further comprises 0.1 to 5 parts by weight of talc powder.

12. The microwave molded body of claim 1, wherein the foamable composition further comprises 1 to 20 parts by weight of a plasticizer, wherein the plasticizer is a benzoate or a derivative thereof.

13. The microwave molded body of claim 1, wherein the foamable composition further comprises 0.1 to 5 parts by weight of a pigment powder, based on 100 parts by weight of the unfoamed thermoplastic polyurethane particles.

14. The microwave molded body of claim 1, wherein the foamable composition comprises 1 to 5 parts by weight of the thickener or the bridging agent.

15. The microwave molded body of claim 1, wherein the microwave molded body is made with a microwave power of 500 W to 30,000 W.

16. The microwave molded body of claim 1, wherein no water is added during treatment of microwave.

17. The microwave molded body of claim 1, wherein 1 to 10 parts by weight of water or an alcohol is added during treatment of microwave, based on 100 parts by weight of the particles of the foamed thermoplastic polyurethane.

18. A method of manufacturing a microwave molded body, comprising:
   providing a foamable composition comprising:
      100 parts by weight of unfoamed thermoplastic polyurethane particles, the unfoamed thermoplastic polyurethane particles have a viscosity of 1,000 poise to 9,000 poise measured at 170° C. according to JISK 7311 test method;
      5 to 25 parts by weight of a foaming agent; and
      0.5 to 5 parts by weight of a thickener or a bridging agent, wherein the thickener is selected from an inorganic thickener or a cellulose thickener;
   foaming and pelletizing of the foamable composition in a screw pelletizer at a first foaming stage to obtain particles of foamed thermoplastic polyurethane; and
   placing the particles of foamed thermoplastic polyurethane in a mold and subjecting the particles of foamed thermoplastic polyurethane to microwave at a second foaming stage to obtain the microwave molded body.

* * * * *